US010503643B1

(12) United States Patent
Rychlik et al.

(10) Patent No.: US 10,503,643 B1
(45) Date of Patent: Dec. 10, 2019

(54) CACHE COHERENCE WITH FUNCTIONAL ADDRESS APERTURES

(71) Applicant: QUALCOMM Incorporated, San Diego, CA (US)

(72) Inventors: Bohuslav Rychlik, San Diego, CA (US); Wesley James Holland, La Jolla, CA (US); Hao Liu, San Diego, CA (US); Andrew Edmund Turner, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 16/032,995

(22) Filed: Jul. 11, 2018

(51) Int. Cl.
*G06F 12/0817* (2016.01)
*G06F 12/0831* (2016.01)

(52) U.S. Cl.
CPC ...... *G06F 12/0822* (2013.01); *G06F 12/0831* (2013.01); *G06F 2212/1016* (2013.01); *G06F 2212/62* (2013.01)

(58) Field of Classification Search
CPC .................................................. G06F 12/00–16
See application file for complete search history.

(56) References Cited

U.S. PATENT DOCUMENTS

| | | | |
|---|---|---|---|
| 9,015,446 B2 | 4/2015 | Cox et al. | |
| 9,342,452 B2 | 5/2016 | Gostin et al. | |
| 9,678,885 B2 | 6/2017 | Muff et al. | |
| 9,892,043 B2 | 2/2018 | Drapala et al. | |
| 2003/0233495 A1* | 12/2003 | Moll ..................... | G06F 12/082 710/1 |
| 2015/0106560 A1* | 4/2015 | Perego .................... | G06F 12/10 711/105 |
| 2017/0286115 A1 | 10/2017 | Coleman et al. | |

\* cited by examiner

*Primary Examiner* — Nicholas J Simonetti
(74) *Attorney, Agent, or Firm* — Muncy, Geissler, Olds & Lowe, P.C.

(57) ABSTRACT

Systems and methods for managing coherency in a processing system comprising a memory involve one or more aperture cache coherency (ACC) blocks. The ACC blocks monitor accesses to the memory using aliased addresses, wherein the aliased addresses map to locations in an aliased address domain of the memory. The ACC blocks also monitor accesses to the memory through a functional address aperture using aperture addresses, wherein a function of the aperture addresses map to locations in an aperture address domain of the memory. The ACC blocks are further configured to maintain coherency between one or more of data in a first location of the memory, the first location belonging to the aliased address domain and the aperture address domain; one or more copies of the data accessed using the aperture addresses; or one or more copies of the data accessed using the aliased addresses.

30 Claims, 14 Drawing Sheets

CACHE COHERENCE WITH FUNCTIONAL ADDRESS APERTURES

FIELD OF DISCLOSURE

Disclosed aspects are directed to systems and methods for managing coherency in a processing system comprising memory. More specifically, exemplary aspects are directed to one or more aperture cache coherency blocks to monitor and maintain coherency between accesses to a memory using an aliased address and through a functional aperture addresses.

BACKGROUND

Cache coherence refers to uniformity of data stored in multiple memory locations such as caches or backing memory (e.g., dynamic random access memory or "DRAM") in processing systems such as a multiprocessor or multi-core processing systems wherein multiple clients (e.g., processors/cores) can access and share data which is ultimately stored in a common memory (e.g., the DRAM). Referring, for example to processing system 100 of FIG. 1, clients 102a-b may have respective caches 104a-b, and a backing storage shown as memory 106. Clients 102a-b may read data from or store data to memory 106, with caches 104a-b acting as respective intermediate storage locations for fast access.

Cache coherency mechanisms generally depicted with the reference numeral 105 may be employed to avoid violation of coherence between cached copies of data associated with a given memory location in memory 106. Known cache coherency mechanisms 105 include snooping, wherein each one of caches 104a-b (or by means of processors, e.g. clients 102a-b) may monitor the other for accesses to addresses cached and ensure coherence. Coherence may be ensured by mechanisms such as cache flushing, cache sharing, etc.

Cache coherence mechanisms may be complicated by situations wherein the data stored in memory 106 can be associated with addresses. A situation wherein the data may have different addresses involves address apertures. An address aperture provides access to the same memory region through an alternative address range. Modern processors (e.g., clients 102a-b) may use virtual addresses which are translated to physical addresses of the data stored in memory 106. These virtual addresses may also be referred to as aliased addresses. Typically, there may be a simple mapping between aperture addresses and the aliased addresses for the same physical memory locations.

However, in instances wherein the address apertures are functional address apertures, the mapping may be more complex. A functional address aperture is an aperture which performs some function on the data as it passes through the aperture. Referring to processing system 200 of FIG. 2, processor 202 may access memory 206 (e.g., through memory bus 208) using aliased address 212 or through functional address aperture 204, wherein function 205 is performed on data addressed using aperture address 210.

Examples of function 205 include encryption, compression, error-correction, etc. Function 205 may introduce a complex mapping between data in aperture address domain (i.e., addressed using aperture address 210) and in aliased address domain (i.e., addressed using aliased address 212). The address mapping between aperture address 210 and aliased address 212 may not be in a direct or one-to-one correspondence. In some instances, an address region in the aperture address domain may correspond to a smaller or larger region in the aliased address domain, e.g., as in the case of functional address aperture 204 implementing compression as function 205.

Accordingly, a single access in the aperture address domain may correspond to zero, one, or more than one accesses in the aliased address domain. The accesses may even be to non-contiguous memory regions of memory 206, e.g., as in the case of functional address aperture 204 implementing error-control coding (ECC) as function 205, wherein parity bits for the ECC for data in a buffer or memory region may be stored in a separate buffer. Function 205 may also include memory or caching such that accesses in the aperture space are delayed or coalesced.

As will be appreciated from the above discussion, functional address apertures may give rise to new and complex demands on coherency between the aperture address domain and aliased address domain. There is a corresponding need in the art to meet these demands for efficiently handling the coherency between the aperture address domain and aliased address domain.

SUMMARY

Exemplary aspects of the invention are directed to systems and methods for managing coherency in processing systems comprising a memory which may be accessed with an aliased address and through a functional address aperture.

For example, an exemplary aspect is directed to a method of managing coherency in a processing system, the method comprising: monitoring accesses to a memory using aliased addresses, wherein the aliased addresses map to locations in an aliased address domain of the memory and monitoring accesses to the memory through a functional address aperture using aperture addresses, wherein a function of the aperture addresses map to locations in an aperture address domain of the memory. The method includes maintaining coherency between one or more of data in a first location of the memory, the first location belonging to the aliased address domain and the aperture address domain; one or more copies of the data accessed using the aperture addresses; or one or more copies of the data accessed using the aliased addresses.

Another exemplary aspect is directed to an apparatus comprising a processing system comprising a memory and one or more aperture cache coherency (ACC) blocks configured to: monitor accesses to the memory using aliased addresses, wherein the aliased addresses map to locations in an aliased address domain of the memory and monitor accesses to the memory through a functional address aperture using aperture addresses, wherein a function of the aperture addresses map to locations in an aperture address domain of the memory. The one or more ACC blocks are also configured to maintain coherency between one or more of data in a first location of the memory, the first location belonging to the aliased address domain and the aperture address domain; one or more copies of the data accessed using the aperture addresses; or one or more copies of the data accessed using the aliased addresses.

Another exemplary aspect is directed to a non-transitory computer-readable storage medium comprising code, which, when executed by a processor, performs operations for managing coherency in a processing system, the non-transitory computer-readable storage medium comprising code for monitoring accesses to a memory using aliased addresses, wherein the aliased addresses map to locations in an aliased address domain of the memory and code for monitoring accesses to the memory through a functional address aperture using aperture addresses, wherein a function of the aperture addresses map to locations in an aperture address domain of the memory. The non-transitory computer-readable storage medium further comprises code for maintaining coherency between one or more of data in a first location of the memory, the first location belonging to the aliased address domain and the aperture address domain; one or more copies of the data accessed using the aperture addresses; or one or more copies of the data accessed using the aliased addresses.

Yet another exemplary aspect is directed to an apparatus comprising means for monitoring accesses to a memory in a processing system, using aliased addresses, wherein the aliased addresses map to locations in an aliased address domain of the memory and means for monitoring accesses to the memory through a functional address aperture using aperture addresses, wherein a function of the aperture addresses map to locations in an aperture address domain of the memory. The apparatus further comprises means for maintaining coherency between one or more of data in a first location of the memory, the first location belonging to the aliased address domain and the aperture address domain; one or more copies of the data accessed using the aperture addresses; or one or more copies of the data accessed using the aliased addresses.

BRIEF DESCRIPTION OF THE DRAWINGS

The accompanying drawings are presented to aid in the description of aspects of the invention and are provided solely for illustration of the aspects and not limitation thereof.

DETAILED DESCRIPTION

Figure 1:
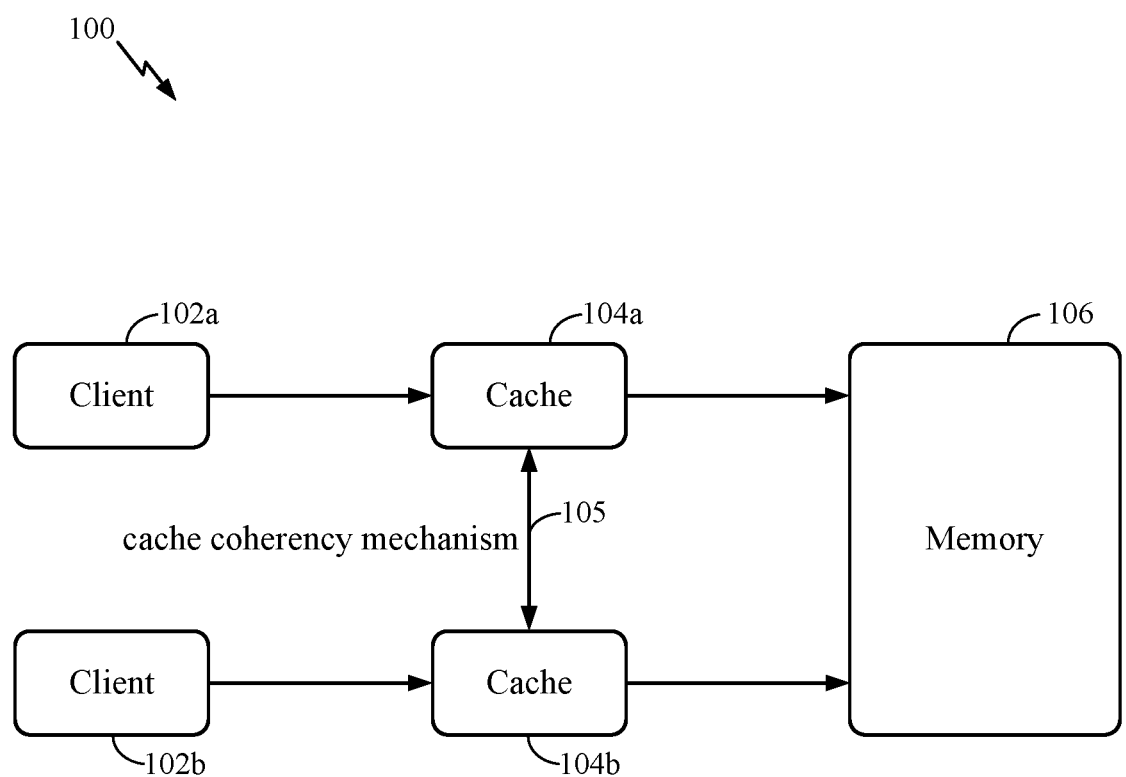
FIG. 1 illustrates a conventional implementation of a processing system.
Figure 2:
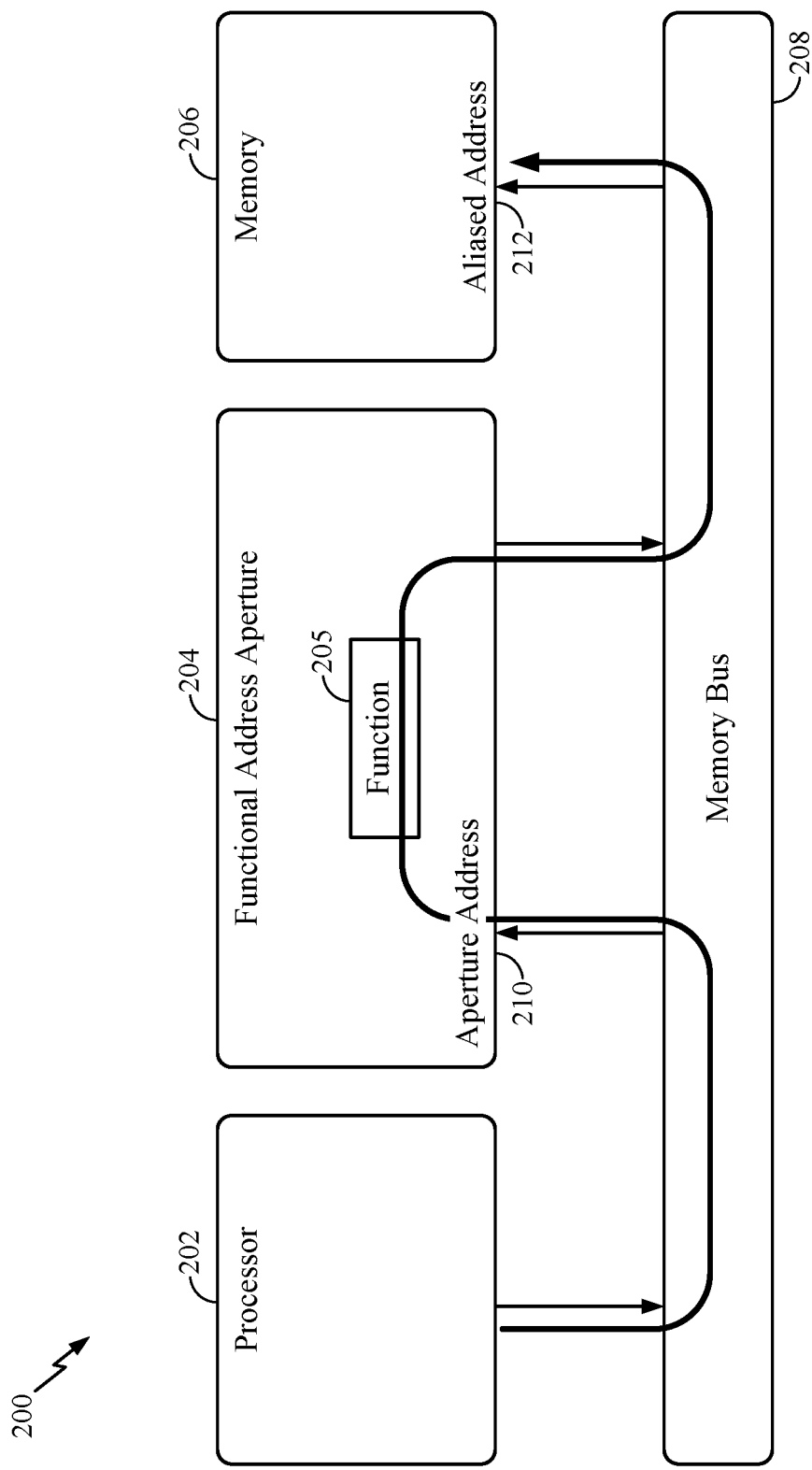
FIG. 2 illustrates a processing system with a functional address aperture.

Aspects of the invention are disclosed in the following description and related drawings directed to specific aspects of the invention. Alternate aspects may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any aspect described herein as "exemplary" is not necessarily to be construed as preferred or advantageous over other aspects. Likewise, the term "aspects of the invention" does not require that all aspects of the invention include the discussed feature, advantage or mode of operation.

The terminology used herein is for the purpose of describing particular aspects only and is not intended to be limiting of aspects of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Exemplary aspects of this disclosure are directed to systems and methods for tracking and maintaining aperture cache coherency in processing systems comprising functional address apertures. One or more aperture cache coherency (ACC) mechanisms are provided, which are aware of mapping between an aperture address domain and an aliased address domain for a memory system which may be accessed through a functional aperture with an aperture address and with an aliased address. The one or more ACC mechanisms may be configured to monitor memory accesses and/or cache coherency operations to the aliased addresses and, if found, generate the corresponding cache coherency operations for the aperture addresses, and vice versa. Example aspects of this disclosure are directed to various ACC mechanisms, which may generate the corresponding cache coherency operations based on the function performed by the functional address aperture. In this disclosure, one or more cache coherency operations in one of the two address domains (aperture address domain or aliased address domain) can correspond to a different number of cache coherence operations in the other address domain.

Referring now to FIGS. 3A-E, some of the problems of coherence issues related to functional address apertures are explained. In FIGS. 3A-E, respective processing systems 300A-E are shown, with one or more processors (e.g., processor 302, 302a-b, etc.), functional address aperture 304 with function 305, and memory 306 accessible through memory bus 308. Aperture address 310 may be used to address data in functional address aperture 304 and aliased address 312 for addressing storage locations in memory 306 without intervention of functional address aperture 304.

Figure 3A:
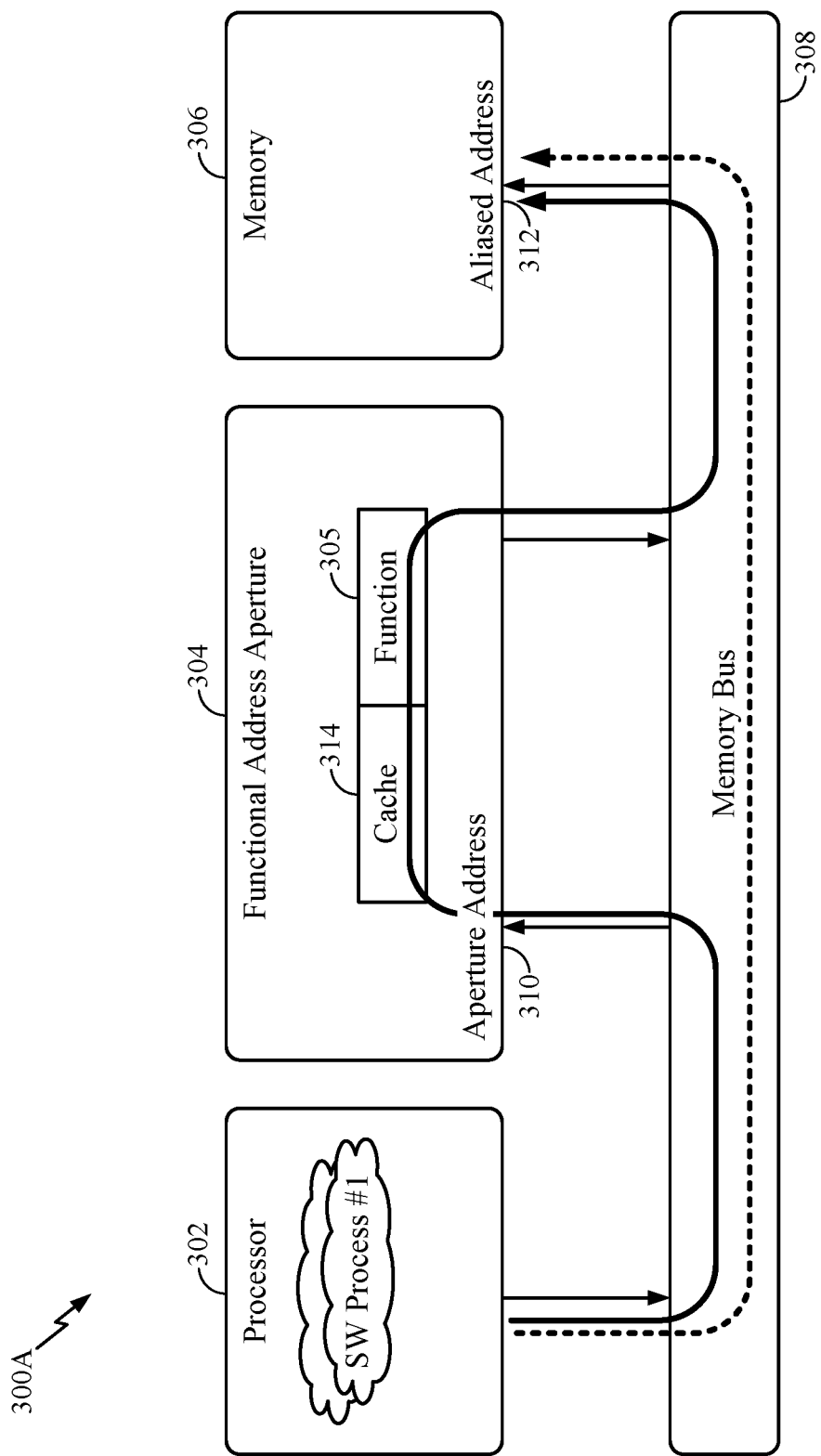
FIGS. 3A-E illustrate problems introduced by functional address apertures in conventional processing systems.

In more detail, FIG. 3A shows processing system 300A with processor 302 which may execute one or more software processes, such as software (SW) process #1 identified in FIG. 3A. Functional address aperture 304 may also include a built-in cache, shown as cache 314. Cache 314 may introduce a cache coherency problem in this case if cache 314 operates on aperture addresses. To explain, two or more software processes running on processor 302 may be able to simultaneously access a memory location in memory 306, with one access indirectly via aperture address 310 and another access to the same underlying memory location directly via aliased address 312. If one of the software processes modifies the underlying data at aliased address 312 while the same (or functionally derived) data exists in cache 314, the data in cache 314 will become silently stale, i.e., the data in cache 314 becoming stale will not be known to the software processes. Likewise, if one of the software processes modifies data in cache 314 while a second software process tries to read the underlying data at aliased address 312, the second software process will retrieve silently stale data.

Figure 3B:
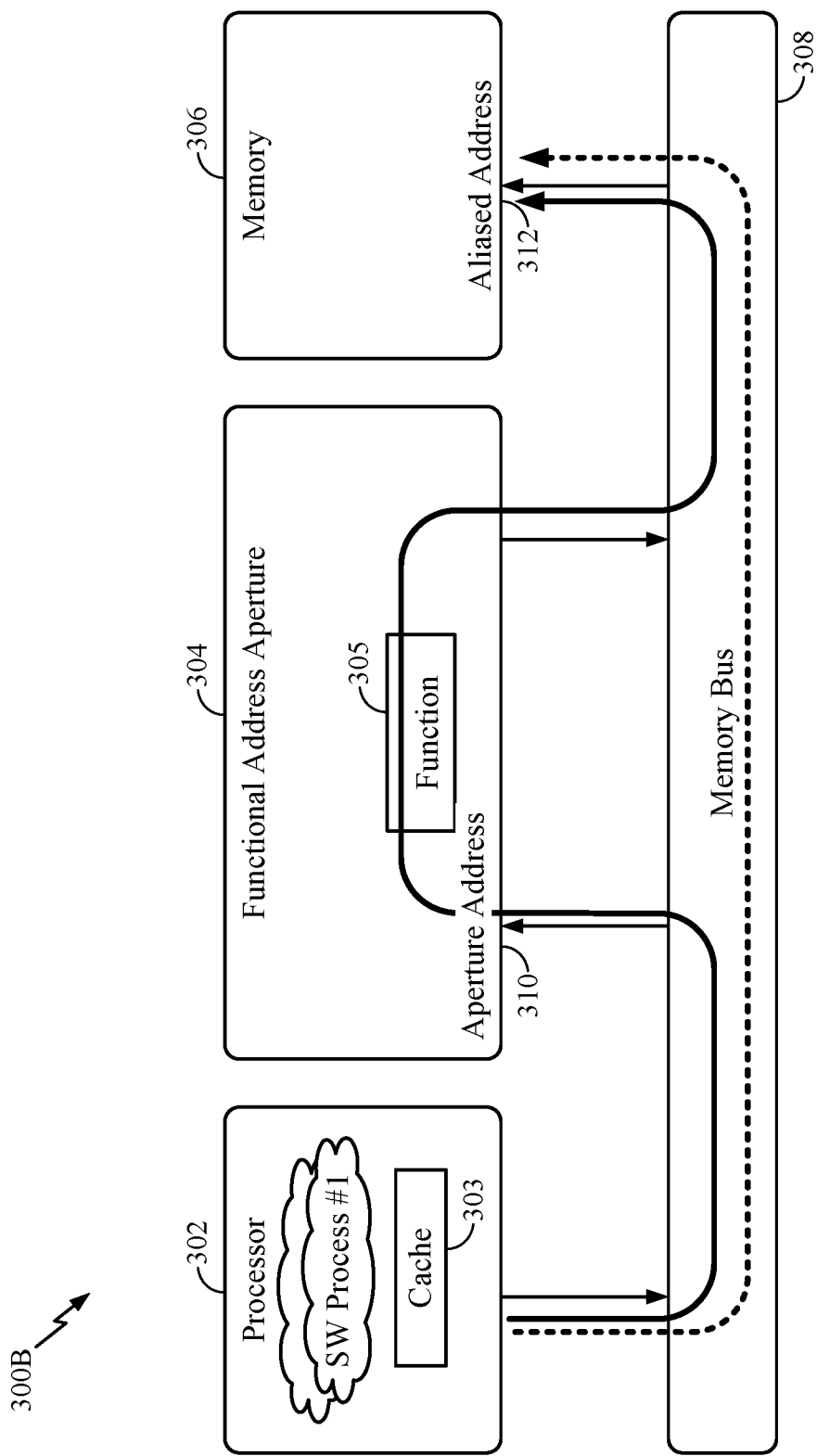

In FIG. 3B, processing system 300B is shown with processor 302 comprising cache 303. In this case, functional address aperture 304 may introduce a cache coherency problem with cache 303. In more detail, two or more software processes running on processor 302 may be able to simultaneously access a memory location in memory 306, with one access indirectly via aperture address 310 and another access to the same underlying memory location directly via aliased address 312. If a software process on processor 302 modifies the underlying data at aliased address 312 while the same (or functionally derived) data exists in cache 303 (with aperture address 310), the data in cache 303 will become silently stale. Likewise, if a software process modifies data in cache 303 while a second software process tries to read the underlying data at aliased address 312, the second software process will retrieve silently stale data.

Figure 3C:
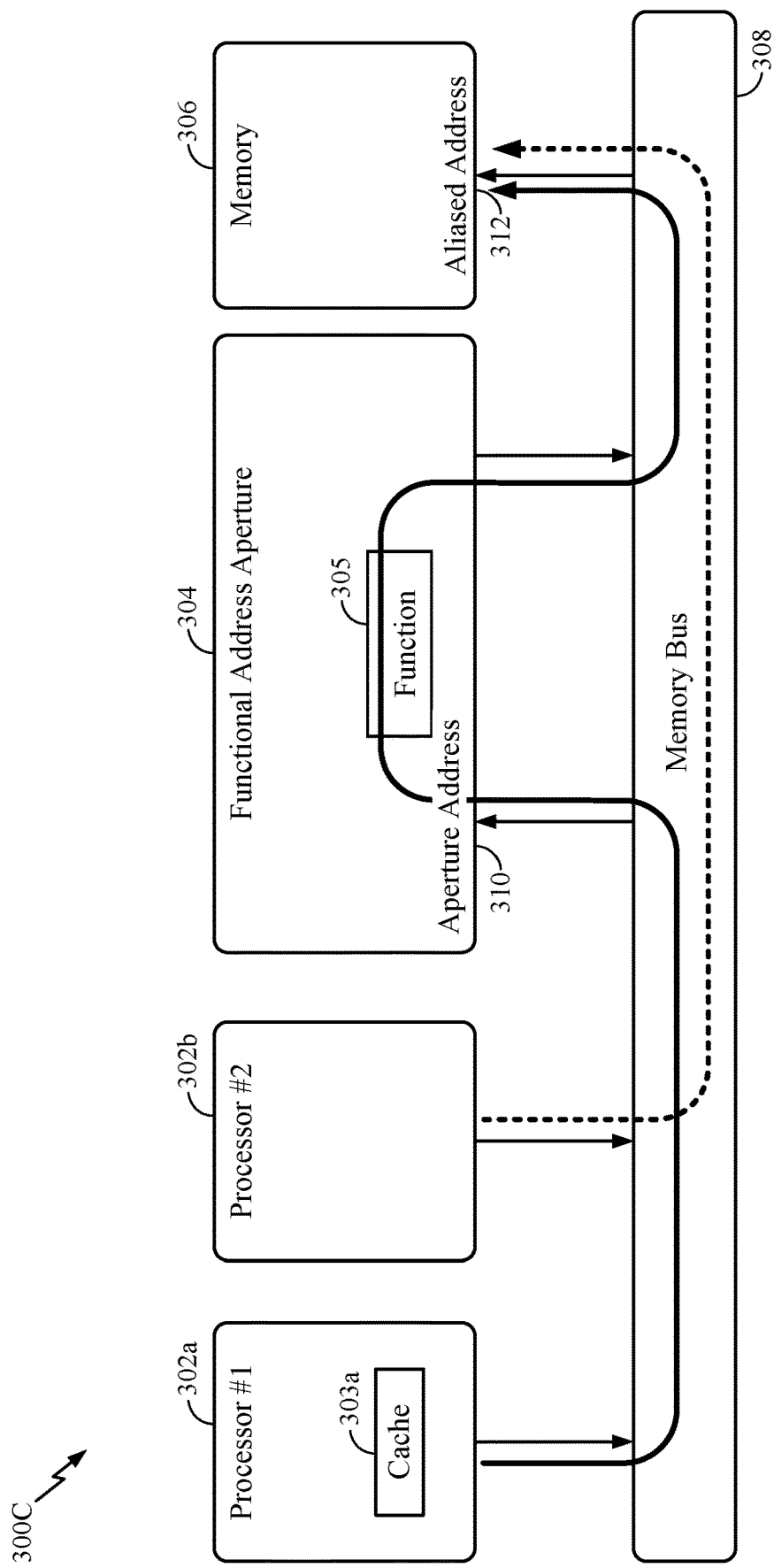

In FIG. 3C, processing system 300C is shown with processors 302a-b, wherein processor 302a comprises cache 303a. In this case, functional address aperture 304 may introduce a cache coherency problem with cache 303a. In more detail, processor 302a may access a memory location indirectly via aperture address 310 while processor 302b is accessing the same underlying memory location directly via aliased address 312. If, while processor 302a has data from aperture address 310 in its cache 303a, processor 302b modifies the underlying data at aliased address 312, the data in cache 303a will silently become stale. Likewise, if processor 302a modifies the data from aperture address 310 in its cache 303a and processor 302b tries to read the underlying data at aliased address 312, processor 302b will retrieve silently stale data.

Figure 3D:
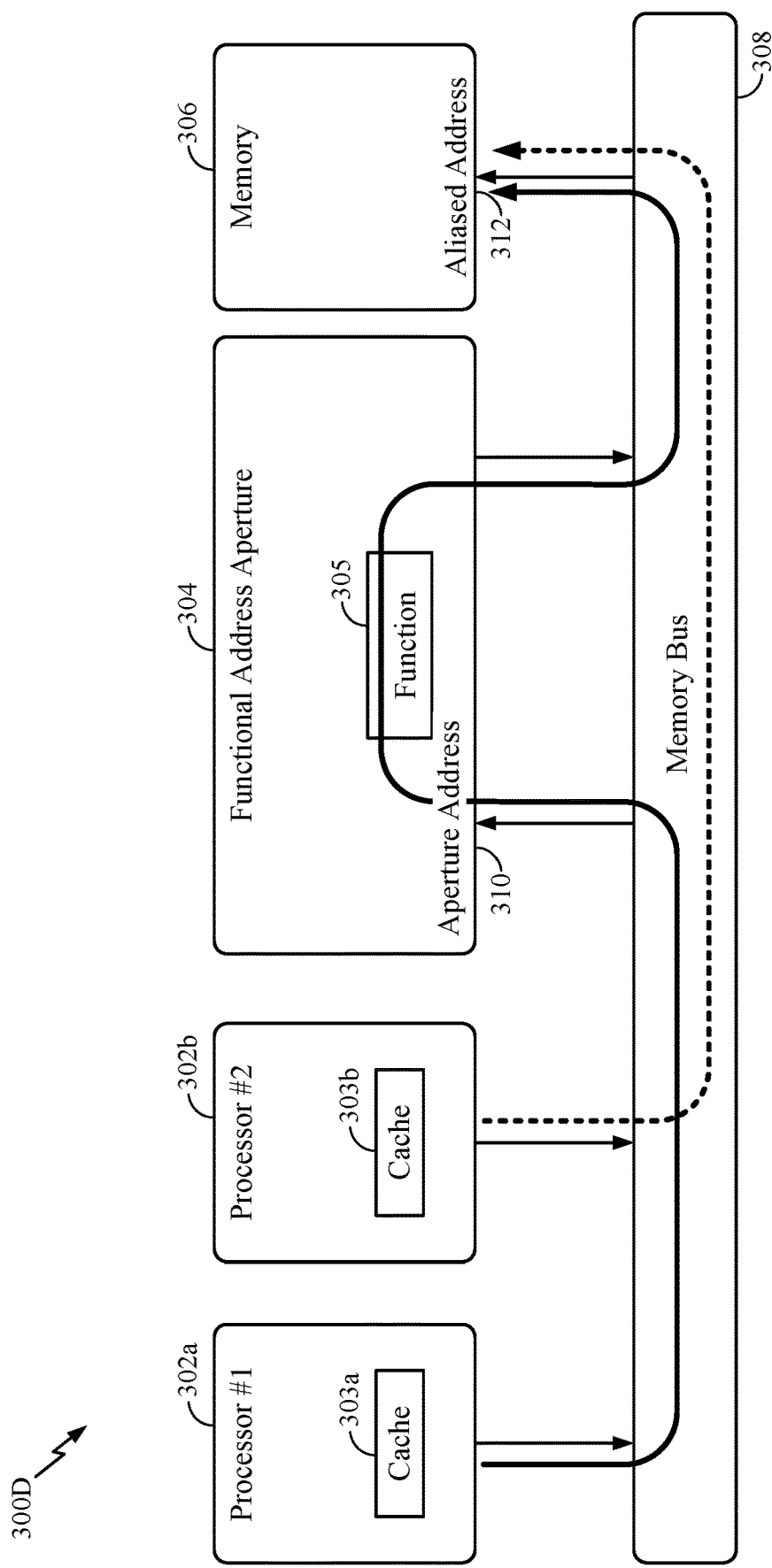

In FIG. 3D, processing system 300D is shown with processors 302a-b comprising caches 303a-b, respectively. In more detail, processor 302a may be access a memory location indirectly via aperture address 310 while processor 302b is accessing the same underlying memory location directly via aliased address 312. If, while processor 302a has data from aperture address 310 in its cache 303a, processor 302b modifies the underlying data at aliased address 312 in its cache 303b, the data in cache 303a will silently become stale. Likewise, if processor 302a modifies the data from aperture address 310 in its cache 303a and processor 302b has data from aliased address 312 in its cache 303b, the data in cache 303b will become silently stale.

Figure 3E:
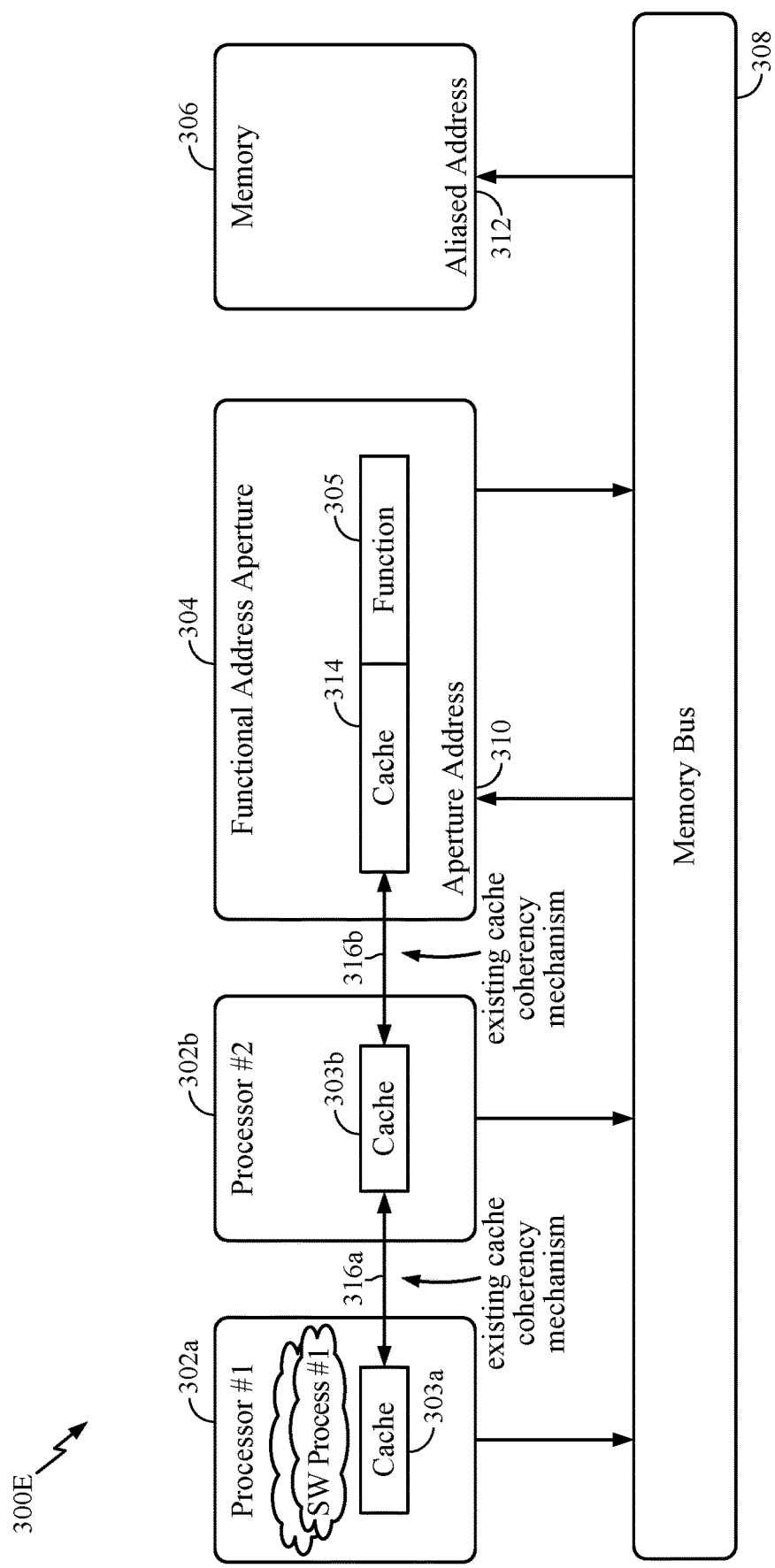

Referring now to FIG. 3E, some limitations of existing efforts to address the above-noted coherency issues are illustrated. Specifically, processing system 300E is shown, comprising the various components described in processing systems 300A-D above, including processors 302a-b with respective caches 303a-b; functional address aperture 304 with cache 314 and function 305, addressable using aperture address 310; memory 306 which may also be accessed using aliased address 312; and memory bus 308 as previously described. Existing hardware coherency mechanisms 316a and 316b are identified for their potential use in maintaining coherency between the various caches 303a-b and 314. These existing hardware coherency mechanisms 316a-b may include snooping and directory checking, for example. However, existing hardware coherency mechanisms 316a-b are insufficient to resolve the above-noted problems with coherency introduced by functional address apertures because they rely on the address or a simple offset mapping for their functions, but a complex, function-dependent mapping of two addresses for equivalent data is beyond the scope of existing hardware coherency mechanisms 316a-b.

Specifically, existing hardware coherency mechanisms 316a-b will be unable to address the coherency issues in situations such as, either of processors 302a-b accessing aperture address 310 while caches 303a-b and 314 are snooped (or the directory checked) for aliased address 312; or either processors 302a-b accessing aliased address 312 while caches 303a-b and 314 are snooped (or the directory checked) for aperture address 310.

Figure 4:
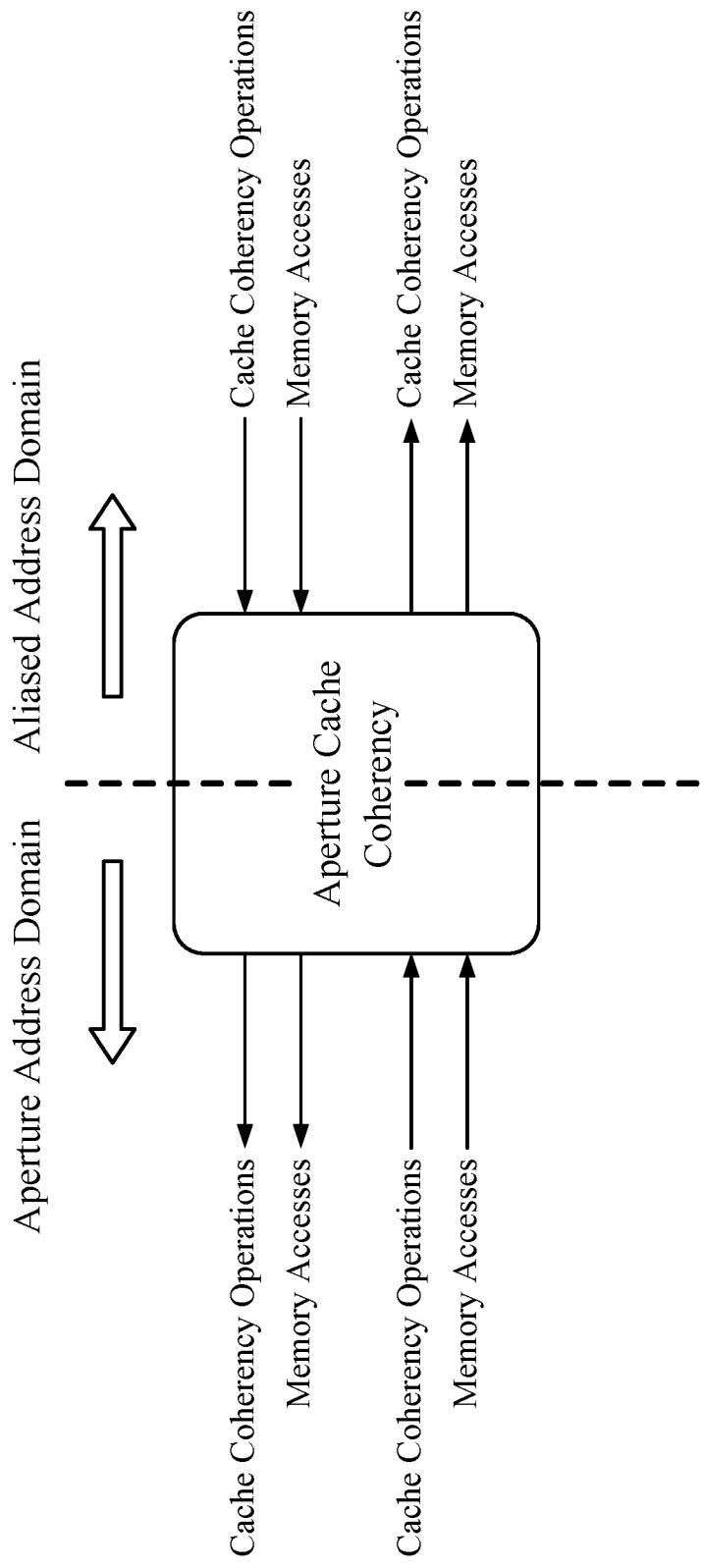
FIG. 4 provides a conceptual view of exemplary solutions for maintaining coherency between data accesses in opposing address domains in processing systems comprising functional address apertures.

Referring now to FIG. 4, a conceptual illustration of exemplary aspects of this disclosure is shown, directed to solving the above-noted problems of coherency introduced by functional address apertures. The exemplary solution, embodiments of which will be discussed in further detail below, involves the inclusion of an Aperture Cache Coherency (ACC) capability in processing systems. Some of the aspects of the exemplary ACC include awareness of the mapping between the aperture address domain and the aliased address mapping, e.g., by virtue of a hardware design, software configuration, or combinations thereof. The ACC may be configured to monitor memory accesses and/or cache coherency operations to the aliased addresses and, if found, generate the corresponding cache coherency operations for the aperture addresses, and vice versa. In example implementations, generating the corresponding cache coherency operations may be based on the function performed by the functional address aperture. It is also noted herein that one or more cache coherency operations in one of the two address domains (aperture address domain or aliased address domain) may correspond to a different number of cache coherency operations in the other address domain.

Different functions and related embodiments of the exemplary ACC will now be described. In a first exemplary embodiment, the function implemented by the functional address aperture may be a first mapping such as a memory compression. In particular, data visible via a specific aperture address domain will correspond to a compressed version of that data in a smaller aliased address domain. For example, data in an aperture address region of the aperture address domain may correspond to a compressed version of the data in an aliased address region of the aliased address domain, wherein the aliased address region is smaller than the aperture address region In the first exemplary embodiment, on access to the aperture address region, the ACC may be configured to generate cache coherency operations corresponding to the smaller address region in the aliased address domain. In some cases, this may mean multiple accesses in the aperture address domain generate a fewer number of cache coherency operations in the aliased address domain. In some cases, the aliased address domain may support a smaller granularity of cache management operation than the aperture address domain.

In the first exemplary embodiment, on access to the aliased address domain, the ACC may be configured to generate cache coherency operations corresponding to the larger address space in the aperture address domain. In some cases, this may mean one access in the aliased address domain will generate multiple cache coherency operations in the aperture address domain. In some cases, the aperture address domain may support a larger granularity of cache management operation than the aliased address domain.

In a converse of the first embodiment, the function may include a second mapping, wherein data in a compressed version of data in the aperture address region of the aperture address domain corresponds to the data in an aliased address region of the aliased address domain, wherein the aliased address region is larger than the aperture address region. In other words, the aperture address domain may be uncompressed and the aliased address region may be compressed, and a similar example implementation of the ACC for this embodiment is within the scope of this disclosure.

In a second exemplary embodiment, the function of the functional address aperture may comprise tiling, wherein data that is contiguous in the aperture address domain may correspond to a noncontiguous (e.g., tiled) representation of data in the aliased address domain, wherein in the noncontiguous representation of data, data elements separated by a stride (e.g., as might be seen in the horizontal width of image data) may be grouped contiguously.

In the second embodiment, on access to the aperture address domain, the ACC may be configured to generate cache coherency operations corresponding to appropriate segments of all affected tiles in the aliased address domain; these cache coherency operations may be non-contiguous in the aliased address domain. If the portion of the tile affected in the aliased address domain is smaller than the cache coherency granularity in the aliased address domain, this may mean that a single access in the aperture address domain generates a larger number of cache coherency operations in the aliased address domain.

In the second embodiment, on access to the aliased address domain, the ACC may be configured to generate cache coherency operations corresponding to appropriate segments of all affected lines in the aperture address domain; these cache coherency operations may be non-contiguous in the aperture address domain. If the portion of the line affected in the aperture address domain is smaller than the cache coherency granularity in the aperture address domain, this may mean that a single access in the aliased address domain generates a larger number of cache coherency operations in the aperture address domain.

In a converse of the second embodiment, the aperture address domain may be tiled and the aliased address domain may be linear, and a similar example implementation of the ACC for this embodiment is within the scope of this disclosure.

In a third exemplary embodiment, the function of the functional address aperture may involve the use of metadata (e.g., error correction), wherein data in the aperture address domain may correspond to two buffers in the alias address domain: a first buffer comprising data and a second buffer comprising metadata (e.g., parity information such as redundancy bits for error correction, in the case of the metadata relating to error correction) corresponding to the data in the first buffer.

In the third embodiment, on access to the aperture address domain, the ACC may be configured to generate cache coherency operations corresponding to the data and parity buffers of the aliased address domain. In the case of writes, both data and parity may need to be coherently written. In the case of reads, both data and parity may need to be coherently read, and a parity error may result in some additional error handling action, such as an interrupt to a software agent. In either case, a single access in the aperture address domain may generate two cache coherency operations in the aliased address domain.

In the third embodiment, on access to the alias address region, the ACC may be configured to generate cache coherency operations corresponding to the data buffer of the aperture address domain. In this case, accesses to corresponding locations in the data and parity buffers in the aliased address domain may generate only a single cache coherency operation in the aperture address domain. In the case wherein only the parity buffer is accessed in the aliased address domain, no cache coherency operation will be generated in the aperture address domain.

In a fourth exemplary embodiment, the function of the functional address aperture may include a third mapping, wherein data in the aperture address domain corresponds to, in the aliased domain, one of two or more aliased address buffers, based on an aliased address buffer pointer in the aliased address domain. For example, the third mapping may comprise double buffering, wherein data visible via a specific aperture address domain may correspond to one of two or more similar buffers, including at least a first aliased address buffer or a second aliased address buffer, in the aliased address domain, based on an aliased address buffer pointer also stored in the aliased address domain.

In the fourth embodiment, on access to the aperture address domain, the ACC may be configured to generate cache coherency operations corresponding to the current "active" buffer of two or more aliased address buffers, e.g., the first aliased address buffer or a second aliased address buffer in the aliased address domain, based on the buffer pointer. No cache management operations need to be generated for the "non-active" buffer of the two or more aliased address buffers, the first aliased address buffer or the second aliased address buffer or the buffer pointer, in the aliased address domain.

In the fourth embodiment, on access to the aperture address domain, the ACC may be configured to, for accesses to the current "active" buffer in the aliased address domain, generate cache coherency operations to the appropriate regions in the aperture address domain. For write accesses to the buffer pointer in the aliased address domain, the ACC may be configured to generate cache coherency operations invalidating the entire buffer region in the aperture address domain. In this case, a single write in the aliased address domain may generate millions of cache coherency operations, depending on buffer size, and no cache management operations need to be generated for accesses to the "non-active" buffer.

Further, in the fourth embodiment, a change in the buffer pointer may cause cache coherency operations to the active buffers in both the aperture address domain and the aliased address domain.

In a converse of the fourth embodiment, the function may comprise a fourth mapping, wherein data in the aliased address domain corresponds to, in the aperture domain, one of two or more aperture address buffers, based on an aperture address buffer pointer in the aperture address domain. For example, for the fourth mapping wherein the aliased address domain is double-buffered and the aperture address domain is windowed, a similar example implementation of the ACC for this embodiment is within the scope of this disclosure.

Figure 5A:
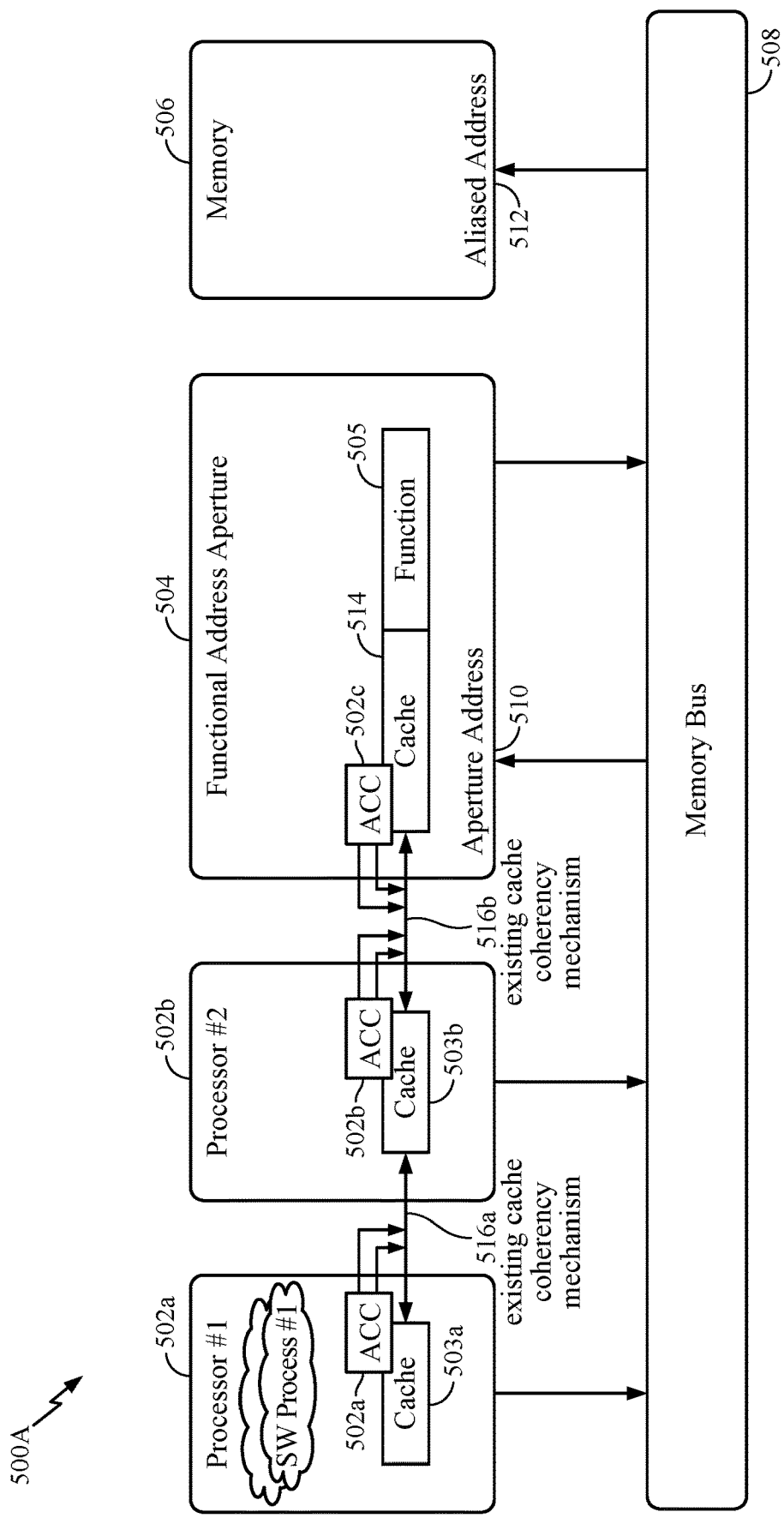
FIGS. 5A-E illustrate exemplary implementations of aperture address caches for maintaining coherency between data accesses in opposing address domains, according to aspects of this disclosure.

With reference to FIG. 5A, a first implementation of the exemplary ACC, for any of the above-mentioned functions in the exemplary embodiments above, is shown in processing system 500A. Specifically, processing system 500A is shown to comprise processors 502a-b with respective caches 503a-b; functional address aperture 504 with cache 514 and function 505, addressable using aperture address 510; memory 506 which may also be accessed using aliased address 512; and memory bus 508. Existing cache coherency mechanisms such as those described in conventional implementations discussed in reference to FIG. 3E are also shown and designated with the reference numerals 516a-b. Additionally, ACC blocks 520a-c according to the first exemplary embodiment are shown and will now be described further.

In FIG. 5A, ACC blocks 520a-c may be provided in-line with each cache, respectively, caches 503a-b and 514. Each ACC block 520a-c may be configured to monitor memory accesses and/or cache coherency operations to aliased address 512 and, if found, generate the corresponding cache coherency operation (snoops/lookups/etc.) for aperture address 510 in the other caches. Each ACC block 520a-c may also be configured to monitor memory accesses and/or cache coherency operations to aperture address 510 and, if found, generate the corresponding cache coherency operation (snoops/lookups/etc.) for the aliased address 512 in the other caches. It some aspects, cache coherency operations (snoops/lookups/etc.) within aperture addresses, or within aliased address may be handled by existing cache coherency mechanisms 516a-b. In FIG. 5A, the exemplary implementation is fully coherent across all processors or cores, which solves the problems described in FIG. 3D above. In this implementation, each memory-access-generating agent, such as processors 502a-b, functional address aperture 504, may have their individual ACC blocks 520a-c, respectively, with mapping between the aliased address domain and the aperture address domain provided to the individual ACC blocks 520a-c; which may require specific software configuration.

Figure 5B:
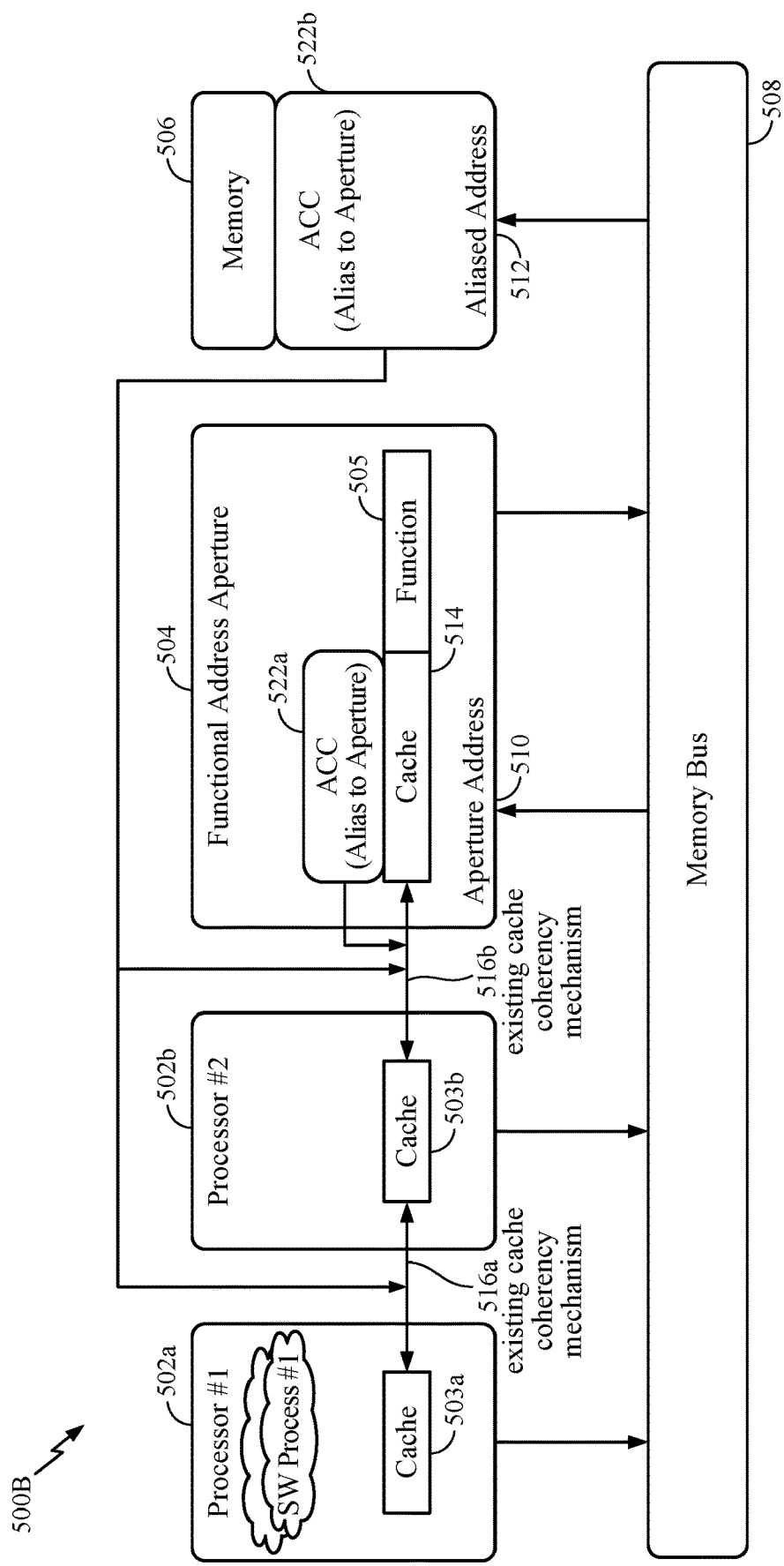

With reference to FIG. 5B, a second implementation of the exemplary ACC, for any of the above-mentioned functions in the exemplary embodiments above, is shown in processing system 500B. While a description of blocks with like-numbered reference numerals which have a similar functionality as those previously described in FIG. 5A will not be repeated, it is seen that in processing system 500B, the ACC functionality is split by directionality. Specifically, instead of in-line ACC blocks 520a-c as shown in FIG. 5A, FIG. 5B has ACC blocks 522a-b. ACC block 522a is in-line with functional address aperture 504 and configured to monitor memory accesses and/or cache coherency operations to aperture address 510 and, if found, generate the corresponding cache coherency operation (snoops/lookups/etc.) for aliased address 512 in the other caches. ACC block 522b is in-line with memory 506, and configured to monitor memory accesses and/or cache coherency operations to aliased address 512 and, if found, generate the corresponding cache coherency operation (snoops/lookups/etc.) for aperture address 510 in the other caches. Once again, cache coherency operations (snoops/lookups/etc.) within aperture addresses, or within aliased address may be handled by existing cache coherency mechanisms 516a-b. In this implementation, ACC blocks 522a-b may maintain coherency with respect to input-outputs to the address ports, but may not solve the problem described in FIG. 3D.

Figure 5C:
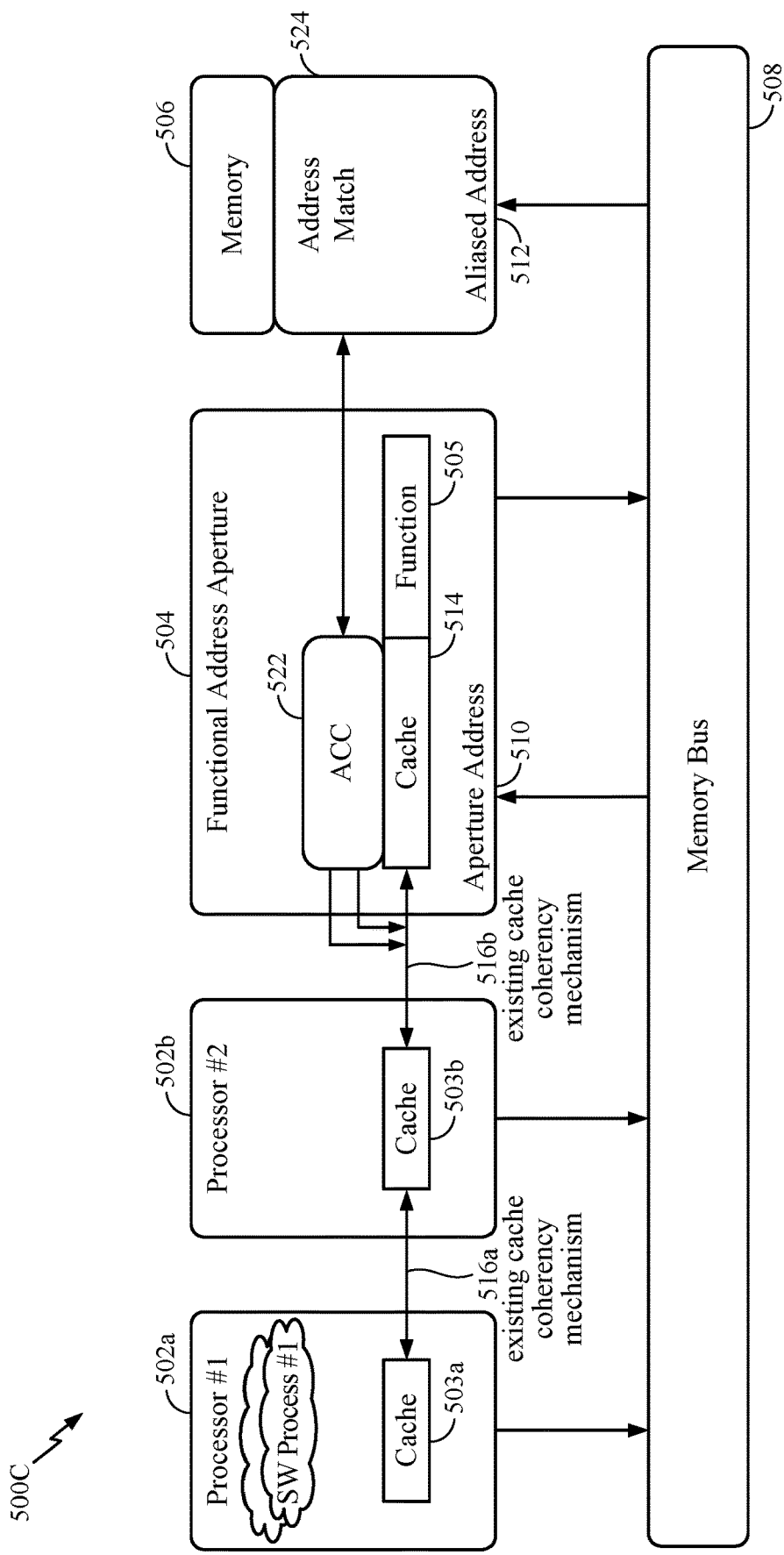

With reference to FIG. 5C, a third implementation of the exemplary ACC, for any of the above-mentioned functions in the exemplary embodiments above, is shown in processing system 500C. Once again, without repeating a description of components with like-numbered reference numerals which have a similar functionality, in FIG. 5C, the ACC functionality is split into ACC block 522, in-line with functional address aperture 504; and address matching logic 524 using comparators, in-line with memory 506. ACC block 522 is configured to receive address match trigger information from address matching logic 524 and generate the corresponding cache coherency operation (snoops/lookups/etc.) for aperture address 510 in the other caches. ACC block 522 is also configured to monitor memory accesses and/or cache coherency operations to aperture address 510 and, if found, generate the corresponding cache coherency operation (snoops/lookups/etc.) for aliased address 512 in the other caches. Once again, cache coherency operations (snoops/lookups/etc.) within aperture addresses, or within aliased address may be handled by existing cache coherency mechanisms 516a-b. This third implementation may advantageously simplify associated software configurations by potentially limiting the configuration to a single block (ACC block 522). In this implementation, ACC block 522 may maintain coherency with respect to input-outputs to the address ports, but may not solve the problem described in FIG. 3D.

Figure 5D:
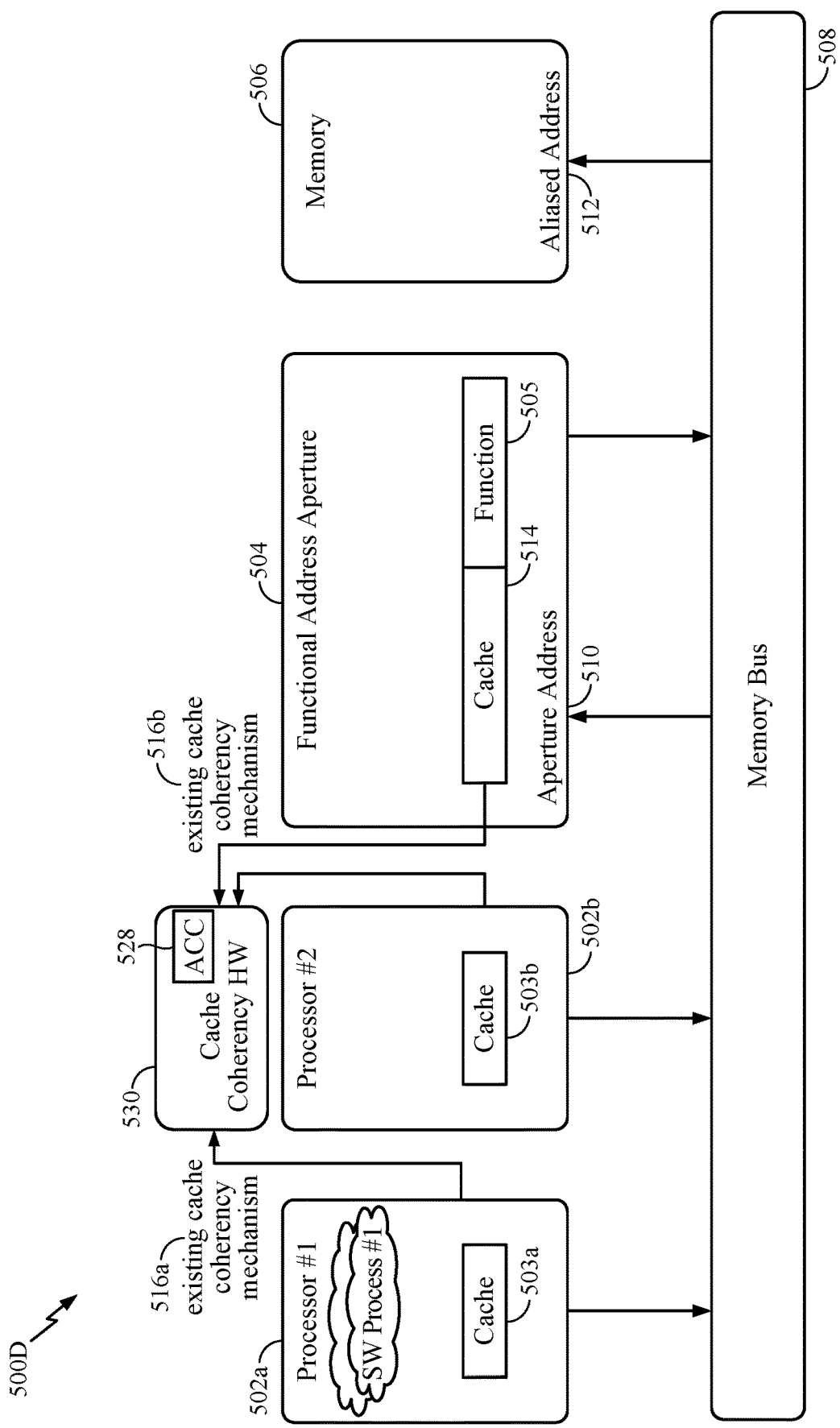

With reference to FIG. 5D, a fourth implementation of the exemplary ACC, for any of the above-mentioned functions in the exemplary embodiments above, is shown in processing system 500D. Once again, without repeating a description of components with like-numbered reference numerals which have a similar functionality, in FIG. 5D, a single ACC block 528 is provided, which does not appear in the memory path to access memory 506 (e.g., through memory bus 508). The ACC block 528 may be provided as part of cache coherency hardware 530, which may be utilized for responding to cache coherency operations from the various caches 503a-b, 514, check coherency in both directions between aperture address domain and aliased address domain. This implementation may be suitable, for example, for cache coherency mechanisms like directories and snoop filters. A beneficial aspect of this implementation includes the fully coherent solution provided across all cores/processors, which means that the problems outlined in FIG. 3D can be solved by using this implementation.

Figure 5E:
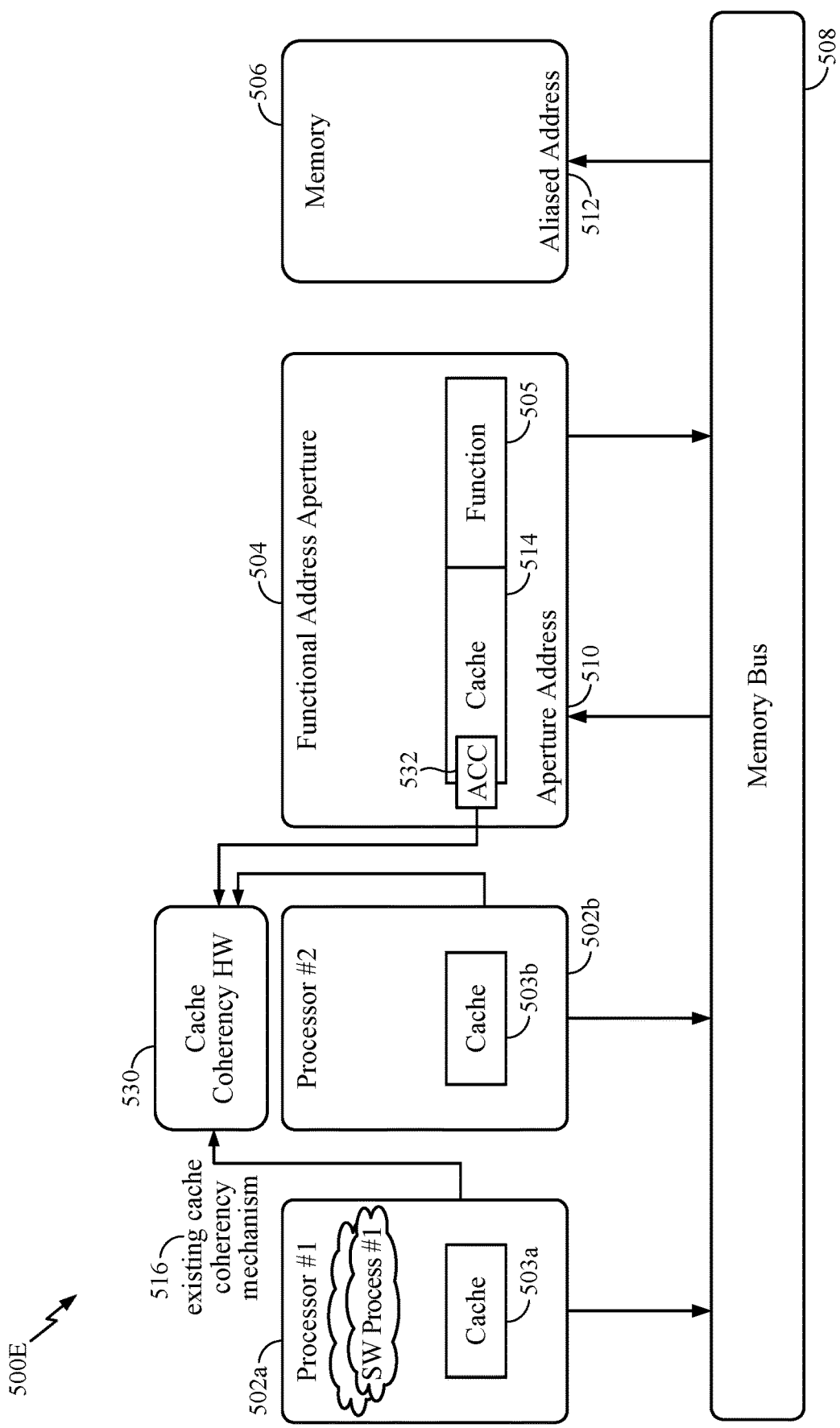

With reference to FIG. 5E, a fifth implementation of the exemplary ACC, for any of the above-mentioned functions in the exemplary embodiments above, is shown in processing system 500E. Once again, without repeating a description of components with like-numbered reference numerals which have a similar functionality, in FIG. 5E, a single ACC block 532 may be located in functional address aperture 504. ACC block 532 may be configured to listen to cache coherency operations from all agents, e.g., processors 502a-b. When cache coherency operations to aliased address 512 are observed, ACC block 532 may generate the corresponding cache coherency operation (snoops/lookups/etc.) for aperture address 510 in the other caches. When cache coherency operations to aperture address 510 are observed, ACC block 532 may generate the corresponding cache coherency operation (snoops/lookups/etc.) for aliased address 512 in the other caches. This implementation may be suitable for cache coherency mechanisms like directories and snoop filters. Beneficial aspects of this implementation includes the fully coherent solution provided across all cores/processors and minimal software configuration, which means that the problems outlined in FIG. 3D can be solved by using this implementation.

It will be appreciated that any of the foregoing embodiments and implementations can be configured to support coherency monitoring in only a single direction (i.e., one of the two directions: aliased address domain to aperture address domain, or vice versa) to reduce hardware cost, although this reduction may be achieved at the expense of moving to one-way cache coherency through the aperture.

Accordingly, the foregoing aspects include using memory accesses into a functional address aperture to generate cache coherency operations for an aliased address domain, as and vice versa: using memory accesses into an aliased address aperture to generate cache coherency operations for an aperture address domain. Aspects also include using cache coherency operations for a functional address aperture to generate cache coherency operations for an aliased address domain, and using cache coherency operations for an aliased address domain to generate cache coherency operations for an aperture address domain. Furthermore, disclosed aspects also include using a hardware address match to a functional address aperture in the memory path as a trigger for cache coherency operations for an aliased address domain and using a hardware address match to an aliased address domain in the memory path as a trigger for cache coherency operations for an aperture address domain.

Figure 6:
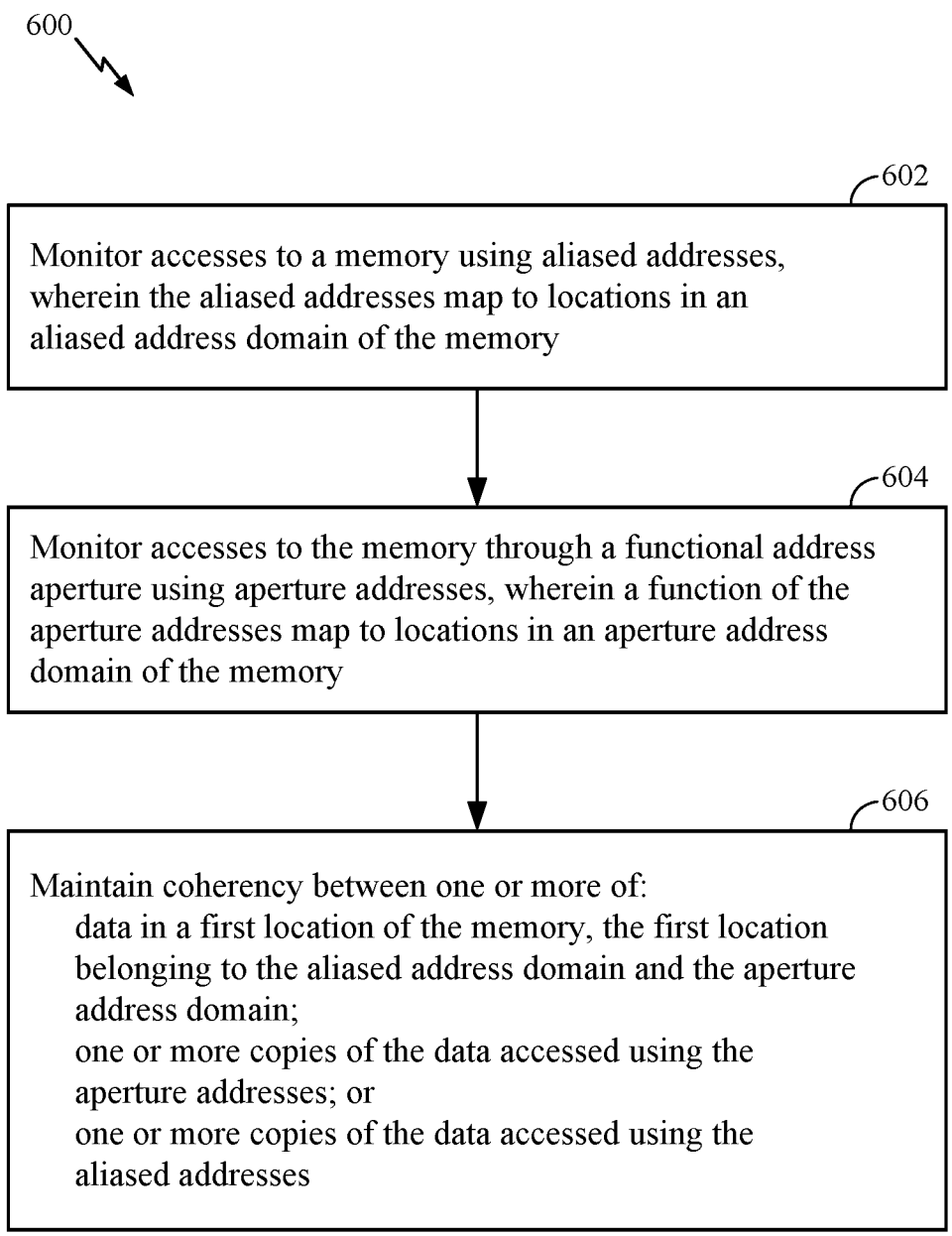
FIG. 6 illustrates an exemplary method of managing coherency in a processing system, according to aspects of this disclosure.

It will be appreciated that exemplary aspects include various methods for performing the processes, functions and/or algorithms disclosed herein. For example, FIG. 6 illustrates a method 600 of managing cache coherency operations between aperture addresses and aliased addresses.

Block 602 of method 600 comprises, monitoring accesses to a memory using aliased addresses, wherein the aliased addresses map to locations in an aliased address domain of the memory.

Block 604 comprises monitoring accesses to the memory through a functional address aperture using aperture addresses, wherein a function of the aperture addresses map to locations in an aperture address domain of the memory.

Block 606 comprises maintaining coherency between one or more of data in a first location of the memory, the first location belonging to the aliased address domain and the aperture address domain; one or more copies of the data accessed using the aperture addresses; or one or more copies of the data accessed using the aliased addresses.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an aspect of the invention can include a computer-readable media embodying a method for managing cache coherency operations between aperture addresses and aliased addresses. Accordingly, the invention is not limited to illustrated examples and any means for performing the functionality described herein are included in aspects of the invention.

While the foregoing disclosure shows illustrative aspects of the invention, it should be noted that various changes and modifications could be made herein without departing from the scope of the invention as defined by the appended claims. The functions, steps and/or actions of the method claims in accordance with the aspects of the invention described herein need not be performed in any particular order. Furthermore, although elements of the invention may be described or claimed in the singular, the plural is contemplated unless limitation to the singular is explicitly stated.

What is claimed is:

1. A method of managing coherency in a processing system, the method comprising:
    monitoring accesses to a memory using aliased addresses, wherein the aliased addresses map to locations in an aliased address domain of the memory;
    monitoring accesses to the memory through a functional address aperture using aperture addresses, wherein a function of the aperture addresses map to locations in an aperture address domain of the memory; and
    maintaining coherency between one or more of:
        data in a first location of the memory, the first location belonging to the aliased address domain and the aperture address domain; or
        one or more copies of the data accessed using the aperture addresses.

2. The method of claim 1, wherein the function comprises one of:
    a first mapping, wherein data in an aperture address region of the aperture address domain corresponds to a compressed version of the data in an aliased address region of the aliased address domain, wherein the aliased address region is smaller than the aperture address region; or
    a second mapping wherein data in a compressed version of data in the aperture address region of the aperture address domain corresponds to the data in an aliased address region of the aliased address domain, wherein the aliased address region is larger than the aperture address region.

3. The method of claim 2, wherein the maintaining coherency comprises one or more of:

for a memory access to the aperture address domain, generating cache coherency operations for the one or more copies of the data in the aliased address domain; or for a memory access to the aliased address domain, generating cache coherency operations for the one or more copies of the data in the aperture address domain.

4. The method of claim 1, wherein the function comprises one of:
- a mapping wherein data in a contiguous region of the aperture address domain corresponds to a tiled representation of data in the aliased address domain with data elements in the tiled representation separated by a stride; or
- a mapping wherein data in a contiguous region of the aliased address domain corresponds to a tiled representation of data in the aperture address domain.

5. The method of claim 4, wherein the maintaining coherency comprises one or more of:
- for a memory access to the aperture address domain, generating cache coherency operations for the one or more copies of all corresponding noncontiguous data in the aliased address domain; or
- for a memory access to the aliased address domain, generating cache coherency operations for the one or more copies of all corresponding noncontiguous data in the aperture address domain.

6. The method of claim 1, wherein the function comprises metadata, wherein data in the aperture address domain corresponds to, in the aliased address domain, a first buffer comprising data and a second buffer comprising metadata related to the data in the first buffer.

7. The method of claim 6, wherein the maintaining coherency comprises one or more of:
- for a memory access to the aperture address domain, generating cache coherency operations for the one or more copies of data in the first buffer and related metadata in the second buffer; or
- for a memory access to the first buffer in the aliased address domain, generating cache coherency operations for the one or more copies of data in the aperture address domain.

8. The method of claim 1, wherein the function comprises one of:
- a first mapping, wherein data in the aperture address domain corresponds to, in the aliased domain, one of two or more aliased address buffers, based on an aliased address buffer pointer in the aliased address domain; or
- a second mapping, wherein data in the aliased address domain corresponds to, in the aperture domain, one of two or more aperture address buffers, based on an aperture address buffer pointer in the aperture address domain.

9. The method of claim 8, wherein the maintaining coherency comprises one or more of:
- for a memory access to the aperture address domain, generating cache coherency operations for an active one of the two or more aliased address buffers, in the aliased address domain; and not generating cache coherency operations for non-active ones of the two or more aliased address buffers in the aliased address domain; or
- for a memory access to the aliased address domain, generating cache coherency operations for an active one of two or more aperture address buffers, in the aperture address domain; and not generating cache coherency operations for non-active ones of the two or more aperture address buffers, in the aperture address domain.

10. The method of claim 1, wherein the processing system comprises two or more processors with two or more processor caches for storing the one or more copies of the data accessed using the aliased address domain, an aperture cache in the functional address aperture for storing the one or more copies of the data accessed using the aperture addresses, and wherein the processing system comprises two or more aperture cache coherency (ACC) blocks for maintaining the coherency, each associated with one of the two or more processor caches and the aperture cache.

11. The method of claim 1, wherein the processing system comprises two or more processors with two or more processor caches for storing the one or more copies of the data accessed using the aliased address domain, an aperture cache in the functional address aperture for storing the one or more copies of the data accessed using the aperture addresses, and wherein the processing system comprises at least a first aperture cache coherency (ACC) block and a second ACC block for maintaining the coherency, with the first ACC block associated with the aperture cache and the second ACC block associated with the memory.

12. The method of claim 1, wherein the processing system comprises two or more processors with two or more processor caches for storing the one or more copies of the data accessed using the aliased address domain, an aperture cache in the functional address aperture for storing the one or more copies of the data accessed using the aperture addresses, and wherein the processing system comprises at least a first aperture cache coherency (ACC) block and a second ACC block for maintaining the coherence, with the first ACC block associated with the aperture cache and the second ACC block comprising an address match logic associated with the memory.

13. The method of claim 1, wherein the processing system comprises two or more processors with two or more processor caches for storing the one or more copies of the data accessed using the aliased address domain, an aperture cache in the functional address aperture for storing the one or more copies of the data accessed using the aperture addresses, and wherein the processing system comprises an aperture cache coherency (ACC) block for maintaining the coherence, with the ACC block separated from a path from the two or more processors and the memory.

14. The method of claim 1, wherein the processing system comprises two or more processors with two or more processor caches for storing the one or more copies of the data accessed using the aliased address domain, an aperture cache in the functional address aperture for storing the one or more copies of the data accessed using the aperture addresses, and wherein the processing system comprises an aperture cache coherency (ACC) block for maintaining the coherence, with the ACC block associated with the aperture cache.

15. An apparatus comprising:
a processing system comprising a memory;
one or more aperture cache coherency (ACC) blocks configured to:
  monitor accesses to the memory using aliased addresses, wherein the aliased addresses map to locations in an aliased address domain of the memory;
  monitor accesses to the memory through a functional address aperture using aperture addresses, wherein a function of the aperture addresses map to locations in an aperture address domain of the memory; and maintain coherency between one or more of:
  data in a first location of the memory, the first location belonging to the aliased address domain and the aperture address domain; or
  one or more copies of the data accessed using the aperture addresses.

16. The apparatus of claim 15, wherein the function comprises one of:
  a third mapping, wherein data in an aperture address region of the aperture address domain corresponds to a compressed version of the data in an aliased address region of the aliased address domain, wherein the aliased address region is smaller than the aperture address region; or
  a fourth mapping wherein data in a compressed version of data in the aperture address region of the aperture address domain corresponds to the data in an aliased address region of the aliased address domain, wherein the aliased address region is larger than the aperture address region.

17. The apparatus of claim 16, wherein the one or more ACC blocks are configured to maintain coherency by on one or more of:
  for a memory access to the aperture address domain, generate cache coherency operations for the one or more copies of the data in the aliased address domain; or
  for a memory access to the aliased address domain, generate cache coherency operations for the one or more copies of the data in the aperture address domain.

18. The apparatus of claim 15, wherein the function comprises one of:
  a mapping wherein data in a contiguous region of the aperture address domain corresponds to a noncontiguous representation of data in the aliased address domain with data elements in the tiled representation separated by a stride; or
  a mapping wherein data in a contiguous region of the aliased address domain corresponds to a noncontiguous representation of data in the aperture address domain.

19. The apparatus of claim 18, wherein the one or more ACC blocks are configured to maintain coherency by one or more of:
  for a memory access to the aperture address domain, generate cache coherency operations for the one or more copies of all corresponding tiled data in the aliased address domain; or
  for a memory access to the aliased address domain, generate cache coherency operations for the one or more copies of all corresponding tiled data in the aperture address domain.

20. The apparatus of claim 15, wherein the function comprises metadata, wherein data in the aperture address domain corresponds to, in the aliased address domain, a first buffer comprising data and a second buffer comprising metadata related to the data in the first buffer.

21. The apparatus of claim 20, wherein the one or more ACC blocks are configured to maintain coherency by one or more of:
  for a memory access to the aperture address domain, generate cache coherency operations for the one or more copies of data in the first buffer and related metadata in the second buffer; or
  for a memory access to the first buffer in the aliased address domain, generate cache coherency operations for the one or more copies of data in the aperture address domain.

22. The apparatus of claim 15, wherein the function comprises one of:
  a third mapping, wherein data in the aperture address domain corresponds to, in the aliased domain, one of two or more aliased address buffers, based on an aliased address buffer pointer in the aliased address domain; or
  a fourth mapping, wherein data in the aliased address domain corresponds to, in the aperture domain, one of two or more aperture address buffers, based on an aperture address buffer pointer in the aperture address domain.

23. The apparatus of claim 22, wherein the one or more ACC blocks are configured to maintain coherency by one or more of:
  for a memory access to the aperture address domain, generate cache coherency operations for an active one of the two or more aliased address buffers, in the aliased address domain; and not generate cache coherency operations for non-active ones of the two or more aliased address buffers in the aliased address domain; or
  for a memory access to the aliased address domain, generate cache coherency operations for an active one of two or more aperture address buffers, in the aperture address domain; and not generate cache coherency operations for non-active ones of the two or more aperture address buffers, in the aperture address domain.

24. The apparatus of claim 15, wherein the processing system comprises two or more processors with two or more processor caches for storing the one or more copies of the data accessed using the aliased address domain, an aperture cache in the functional address aperture configured to store the one or more copies of the data accessed using the aperture addresses, and wherein the processing system comprises two or more ACC blocks, each associated with one of the two or more processor caches and the aperture cache.

25. The apparatus of claim 15, wherein the processing system comprises two or more processors with two or more processor caches configured to store the one or more copies of the data accessed using the aliased address domain, an aperture cache in the functional address aperture configured to store the one or more copies of the data accessed using the aperture addresses, and wherein the one or more ACC blocks comprise at least a first ACC block associated with the aperture cache and a second ACC block associated with the memory.

26. The apparatus of claim 15, wherein the processing system comprises two or more processors with two or more processor caches configured to store the one or more copies of the data accessed using the aliased address domain, an aperture cache in the functional address aperture configured to store the one or more copies of the data accessed using the aperture addresses, and wherein the one or more ACC blocks comprise at least a first ACC block associated with the aperture cache and a second ACC block comprising an address match logic associated with the memory.

27. The apparatus of claim 15, wherein the processing system comprises two or more processors with two or more processor caches configured to store the one or more copies of the data accessed using the aliased address domain, an aperture cache in the functional address aperture configured to store the one or more copies of the data accessed using the aperture addresses, and wherein the one or more ACC blocks comprise an ACC block separated from a path from the two or more processors and the memory.

28. The apparatus of claim 15, wherein the processing system comprises two or more processors with two or more processor caches configured to store the one or more copies of the data accessed using the aliased address domain, an aperture cache in the functional address aperture configured to store the one or more copies of the data accessed using the aperture addresses, and wherein the two or more ACC blocks comprise an ACC block associated with the aperture cache.

29. A non-transitory computer-readable storage medium comprising code, which, when executed by a processor, performs operations for managing coherency in a processing system, the non-transitory computer-readable storage medium comprising:
  code for monitoring accesses to a memory using aliased addresses, wherein the aliased addresses map to locations in an aliased address domain of the memory;
  code for monitoring accesses to the memory through a functional address aperture using aperture addresses, wherein a function of the aperture addresses map to locations in an aperture address domain of the memory; and
  code for maintaining coherency between one or more of:
    data in a first location of the memory, the first location belonging to the aliased address domain and the aperture address domain; or
    one or more copies of the data accessed using the aperture addresses.

30. An apparatus comprising:
means for monitoring accesses to a memory in a processing system, using aliased addresses, wherein the aliased addresses map to locations in an aliased address domain of the memory;
means for monitoring accesses to the memory through a functional address aperture using aperture addresses, wherein a function of the aperture addresses map to locations in an aperture address domain of the memory; and
means for maintaining coherency between one or more of:
  data in a first location of the memory, the first location belonging to the aliased address domain and the aperture address domain; or
  one or more copies of the data accessed using the aperture addresses.

* * * * *